(12) United States Patent
Wojcik

(10) Patent No.: US 11,165,585 B2
(45) Date of Patent: Nov. 2, 2021

(54) TOKEN REPOSITORY AND INTEGRATION

(71) Applicant: International Business Machines Corporation, Armonk, NY (US)

(72) Inventor: Marci R. Wojcik, Grand Blanc, MI (US)

(73) Assignee: International Business Machines Corporation, Armonk, NY (US)

(*) Notice: Subject to any disclaimer, the term of this patent is extended or adjusted under 35 U.S.C. 154(b) by 143 days.

(21) Appl. No.: 16/437,393

(22) Filed: Jun. 11, 2019

(65) Prior Publication Data
US 2020/0396077 A1 Dec. 17, 2020

(51) Int. Cl.
H04L 29/08 (2006.01)
H04L 9/08 (2006.01)
H04L 9/32 (2006.01)

(52) U.S. Cl.
CPC ............ H04L 9/3234 (2013.01); H04L 9/088 (2013.01); H04L 9/3213 (2013.01); H04L 67/32 (2013.01)

(58) Field of Classification Search
CPC ..... H04L 67/32; H04L 9/088; H04L 63/0807; H04L 9/3234; H04L 9/3213; H04L 63/10; H04L 67/1097; H04L 67/02; G06F 21/00
See application file for complete search history.

(56) References Cited

U.S. PATENT DOCUMENTS

| 7,552,468 | B2 | 6/2009 | Burch et al. |
| 8,826,419 | B2 | 9/2014 | Austin |
| 9,497,184 | B2 | 11/2016 | Fork et al. |
| 9,699,170 | B2 | 7/2017 | Sondhi et al. |
| 2002/0112178 | A1* | 8/2002 | Scherr ................. G06F 12/1466 726/4 |
| 2013/0174244 | A1* | 7/2013 | Taveau ................... G06Q 20/12 726/9 |
| 2014/0026194 | A1* | 1/2014 | Smith ................. G06F 21/6245 726/4 |
| 2016/0119291 | A1* | 4/2016 | Zollinger .............. H04L 9/3228 713/171 |
| 2017/0220793 | A1* | 8/2017 | Birgisson ................ G06F 21/45 |
| 2017/0223005 | A1* | 8/2017 | Birgisson ............ H04L 63/0807 |
| 2017/0331832 | A1 | 11/2017 | Lander et al. |

(Continued)

FOREIGN PATENT DOCUMENTS

WO WO 2018/053122 3/2018

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — Mohammad A Siddiqi
(74) *Attorney, Agent, or Firm* — Heslin Rothenberg Farley & Mesiti P.C.; Michael A. Petrocelli, Esq.

(57) ABSTRACT

A method, computer program product, and a system to globally serialize transactions where a processor(s) monitors issuance of access tokens by one or more applications. The processor(s) determines that a portion of the issued access tokens comprise a set of access tokens that provide access to an application provided as a service in the shared computing environment. The processor(s) generates a super token, where the generating comprises mapping the super token to the set of access tokens. The processor(s) stores the super token in a repository. The processor(s) provides the super token to authorized users requesting access to the application.

16 Claims, 7 Drawing Sheets

(56) References Cited

U.S. PATENT DOCUMENTS

| | | |
|---|---|---|
| 2018/0034795 A1 | 2/2018 | Los et al. |
| 2018/0109398 A1* | 4/2018 | Zotti ..................... H04L 12/413 |
| 2019/0372962 A1* | 12/2019 | Maria ................... H04L 63/108 |
| 2020/0007530 A1* | 1/2020 | Mohamad Abdul .... H04L 67/26 |
| 2020/0084202 A1* | 3/2020 | Smith ..................... H04L 67/28 |
| 2020/0204542 A1* | 6/2020 | Nair ...................... G06F 21/335 |
| 2020/0250664 A1* | 8/2020 | Kumar .................. H04L 63/083 |
| 2020/0394709 A1* | 12/2020 | Cella ....................... G06N 5/04 |

* cited by examiner

TOKEN REPOSITORY AND INTEGRATION

BACKGROUND

A microservice architecture is a method of developing software systems that enables support for a range of platforms and devices. Because of this cross-platform and cross-device flexibility, this architecture is often utilized in shared computing systems and distributed systems, including in cloud computing systems. A microservice architecture provides a method for developing software applications, which are also referred to herein as information services, as suites of independently deployable, small, modular services, in which each service runs a unique process and communicates through a well-defined, lightweight, mechanism to serve a defined goal. Thus, a microservice architecture can be utilized to deploy multiple services that work together as a unique application. In this architecture, the overall versioning is represented by the sum of the single service code version. The multiplicity of the services provides a cohesive software solution across devices and platforms.

Applications that are offered as services in a shared and/or distributed computing environment can be accessed utilizing tokens to authenticate accesses. The various applications provided in a shared and/or distributed computing environment can be offered as microservices. A benefit of augmenting functionality into microservices, which can be accessed via an application programming interface (API), is that each microservice accessed can represent a distinct component and can be utilized in a manner where each microservice remains completely autonomous and unaware of the functioning of other microservices, while also enabling structural variations between sources and targets. This autonomous framework is referred to as a decoupled architecture. Microservices provided in shared and/or distributed computing environments, including but not limited to, cloud computing environments, can be highly decoupled services that integrate with other microservices and external applications via token authentication and authorization.

SUMMARY

Shortcomings of the prior art are overcome and additional advantages are provided through the provision of a method for providing consistent access to applications in a shared computing environment. The method includes, for instance: monitoring, by one or more processors of a shared computing environment, issuance of access tokens by one or more applications; determining, by the one or more processors, that a portion of the issued access tokens comprise a set of access tokens that provide access to an application provided as a service in the shared computing environment; generating, by the one or more processors, a super token, wherein the generating comprises mapping the super token to the set of access tokens; storing, by the one or more processors, the super token in a repository; and providing, by the one or more processors, the super token to authorized users requesting access to the application.

Shortcomings of the prior art are overcome and additional advantages are provided through the provision of a computer program product for providing consistent access to applications in a shared computing environment. The computer program product comprises a storage medium readable by a processing circuit and storing instructions for execution by the processing circuit for performing a method. The method includes, for instance: monitoring, by one or more processors of a shared computing environment, issuance of access tokens by one or more applications; determining, by the one or more processors, that a portion of the issued access tokens comprise a set of access tokens that provide access to an application provided as a service in the shared computing environment; generating, by the one or more processors, a super token, wherein the generating comprises mapping the super token to the set of access tokens; storing, by the one or more processors, the super token in a repository; and providing, by the one or more processors, the super token to authorized users requesting access to the application.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
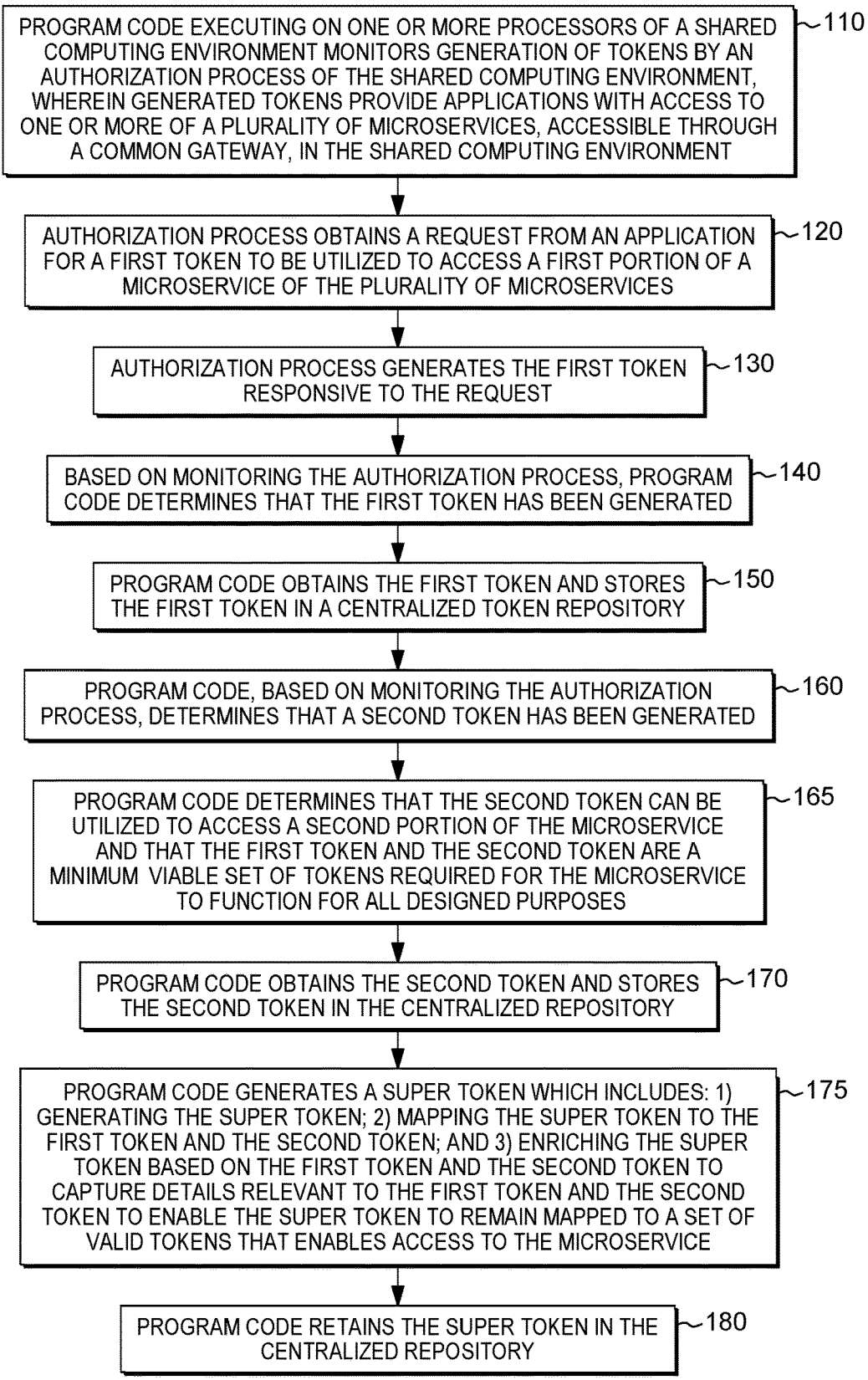
FIG. 1 is a workflow that illustrates certain aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
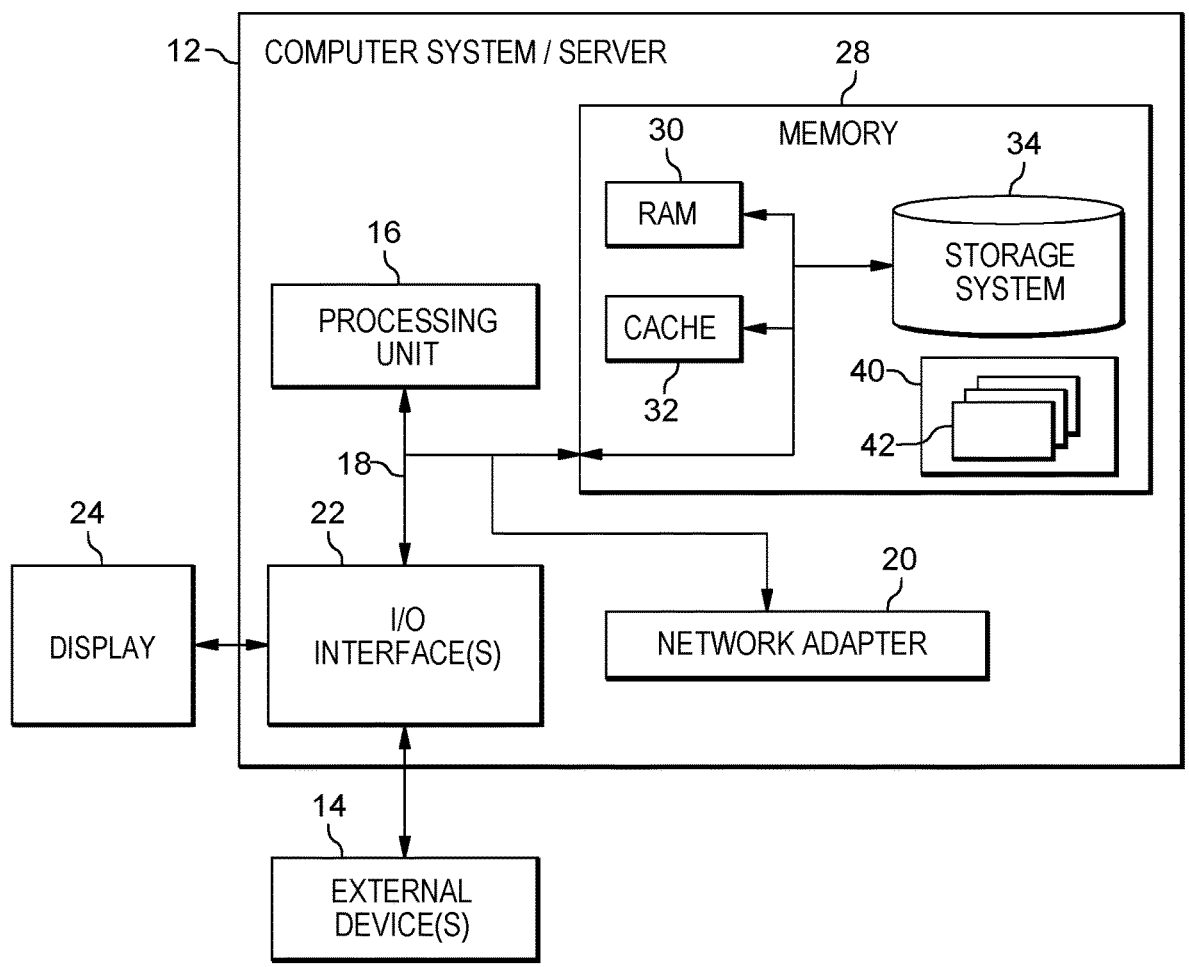
FIG. 5 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 5 as program/utility 40, having a set (at least one) of program modules 42, may be stored in memory 28.

Embodiments of the present invention include a computer-implemented method, a computer program product, and a computer system where program code executing on at least one processor materializes token lifecycles into a super (user group-utilized) token so that users and groups of users can utilize a most current and valid set of integration tokens during development and testing activities. Because various external applications (e.g., APIs) participate in the authentication of tokens, the tokens can have an ad hoc lifecycle. External integrations in the form of login and access workflows have given rise to various forms of the token lifecycle. This ad hoc lifecycle can affect access to microservices and overall system efficiency. Embodiments of the present invention address this practical issue by causing users connecting to a microservice to utilize the aforementioned most current and valid set of integration tokens during development and testing activities (i.e., a super token). In order to provide a set of effective tokens, via a mapping to a super token, embodiments of the present invention discover sets of tokens utilized to access a given microservice and resolve these tokens (such that a given user can always access a microservice with the one or more required valid/non-expired tokens).

In technical environments where applications are provided as microservices (i.e., a collection of loosely coupled services, which are fine-grained and the protocols are lightweight) program code executing on a processing resource comprising some embodiments of the present invention: 1) detects and/or curates information relevant to a multiplicity of tokens used for accessing respective services within the microservices environment; 2) defines a set of tokens from the multiplicity of tokens which are related to a microservice (i.e., the defined tokens enable the microservice to function); and 3) generates a super token for the set of tokens. The program code maps the tokens (and refreshed tokens) in the set of tokens to the super token with a unique identifier (e.g., a user identifier or userid). The set of tokens, in embodiments of the present invention, represents a minimum viable set of tokens required for a microservice to function for all designed purposes. As aforementioned, the super token is mapped to the set of tokens and two examples of these mappings utilized in embodiments of the present invention are: 1) the super token is mapped to a predefined external application programming interface (API) to access the effective tokens and refreshed tokens (the program code continually checks and facilitates the updating/refreshing of tokens to maintain a current set) of the set; and 2) the super token is mapped to a specific set of effective tokens and refreshed tokens that were created by a user. In embodiments of the present invention, the super token allows the same access to the microservice and the API (utilized to access the microservice) which the set of tokens enabled. Once the set of token is defined, the program code regularly updates the defined set of tokens with new tokens and information for accessing the respective microservice (e.g., generating refreshed tokens).

In some shared computing environments, an authentication gateway is responsible for authenticating tokens to enable access to services, including but not limited to, microservices. In embodiments of the present invention, the authentication process is simplified because a super token represents an entire set of tokens required for a service (e.g., microservice) to function (i.e., the minimum viable set of tokens required for the microservice to function for all designed purposes). The utilization of the super token simplifies the administration of tokens as well as their use in shared computing environments, including but not limited to, cloud-based microservice environments. One example of an authentication gateway into which aspects of the present invention can be implemented is the DataPower® API Gateway. DataPower® is a registered trademark of International Business Machines Corporation, Armonk, N.Y., US. In existing approaches, when tokens are utilized for authentication, including in the DataPower® API Gateway, a user can access an application and upon this access, the user is redirected to an authentication process, which authenticates the user. The authentication will redirect the user to the application with an authorization token, which the application exchanges for access (e.g., an access token). To access an API to access a microservice, a requestor utilizes a valid access token. Tokens are assigned a lifecycle by the authentication program and although a refreshed token can be requested by a user, and granted by the authentication program, there are still instances where a user will be utilizing an expired or otherwise invalid token. Embodiments of the present invention include aspects that streamline this approach.

The efficiency benefit provided by aspects of some embodiments of the present invention is realized when users on teams are working together to utilize microservices for development and testing. Using presently available authentication methods, team members can spend significant time and resources to locate correct integration tokens and manually accumulate universal resource locators (URLs), token values, expirations date(s), group members, account information, etc., to manually maintain current tokens. In embodiments of the present invention, program code executing on one or more processors (which can execute as a service) automatically acquires and centrally stores tokens, such as project level tokens, and represents the set of tokens into a super token. To access a microservice, a user need only access a super token, which can be mapped to a predefined external application programming interface (API) to access the effective tokens and refreshed tokens that enables access to the microservice or can be mapped to a specific set of effective tokens and refreshed tokens that were created by a user that enable access to the microservice. These aspects decrease work duplication, increase team collaboration, and save lots of time in manually creating tokens and locating valid tokens. Another benefit of aspects of some embodiments of the present invention is that these aspects enable controls over who can access the tokens and can track and provide a history of the user of the tokens by users.

In embodiments of the present invention, program code executing on a processing resource of the shared computing environment that provides the microservices being accessed automatically detects, curates, and enriches token information into a super token and stores this information in a repository, including but not limited to a memory resource, such as a database, of the shared computing environment and/or accessible to resources of the shared computing environment. To retrieve valid tokens that enable access to a microservice, in embodiments of the present invention, a user and/or process can query the memory resource to obtain a super token, which enables the user to access a current set of tokens. The program code maintains a set of valid tokens, accessible to the user via the super token, by continually testing these tokens, thus, enabling the user to utilize the (valid) tokens for interacting with aspects of the environment (e.g., development and testing activities).

As discussed above, program code in some embodiments of the present invention curates token information. The program code curates this data through auto-discovery of access token creation and/or renewal. The program code, which can be understood to execute as a (discover) service in the shared computing environment follows, analyzes, amends and stores access tokens when the tokens are generated or regenerated. In some embodiments of the present invention, the program code of this discovery service monitors token generating and regenerating activities such that it can curate the generated or regenerated tokens consecutively with the generating and regenerating.

As discussed above, program code in some embodiments of the present invention enriches token information. Enriching the data can include adding data such as, but not limited to, time of capture, user, expiration date, and other related data and storing these data in the tokens database with the tokens. In some embodiments of the present invention, the enriched data can be added to the data comprising the tokens as metadata. In other embodiments of the present invention, the enriched data can be stored in the token repository and linked to the respective token to which it pertains, such that a user and/or process accessing the token repository can access the enriched data for the resident tokens.

In some embodiments of the present invention, the querying of the token repository would be enabled by RESTful web services (REST) APIs. As understood by one of skill in the art, REST or RESTful web services provide interoperability between computer systems on the Internet. REST-compliant web services enable a requestor to access and manipulate representations of web resources (e.g., applications) using a uniform and predefined set of stateless operations. A REST API uses general HTTP requests to GET, PUT, POST and DELETE data and relies on a stateless, client-server, cacheable communications protocol. REST is an architecture style for designing networked applications and is therefore particularly prevalent in and relevant to, multi-server (multi-resource) computing environments, including but not limited to shared computing environments and cloud computing environments. Specifically, because APIs provide interoperability between computer systems and allow for standardized connectivity, they are frequently utilized as endpoints on servers that enable other resources to access applications associated with the APIs that are deployed on the servers. For example, various REST APIs may be available from each of the individual servers in a multi-server environment, such as a cloud computing environment, providing endpoints to applications, including conversational agents and legacy websites, executing or being served by, the various servers. In some embodiments of the present invention, REST APIs provide an endpoint to the token store. As discussed above, in some embodiments of the present invention, the super token is mapped to a predefined external API to access the effective tokens and refreshed tokens in set utilized to access a microservice.

Figure 2:
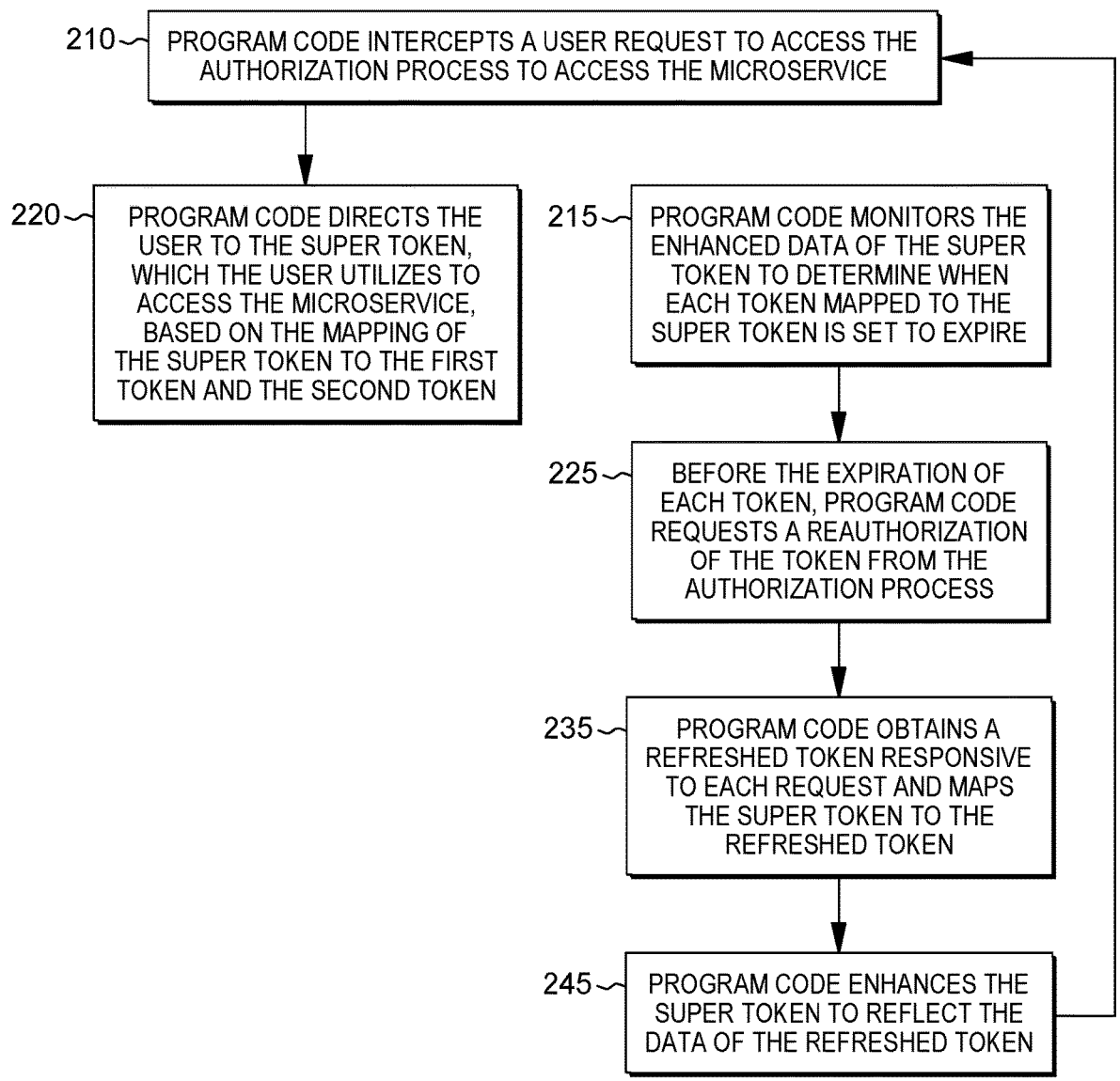
FIG. 2 is a workflow that illustrates certain aspects of some embodiments of the present invention.

FIGS. 1-2 illustrate workflows 100 200 that includes aspects of some embodiments of the present invention. In embodiments of the present invention, not only does program code in embodiments of the present invention monitor the generation of tokens in order to generate a super token that is mapped to a set of generated tokens which provide access to a microservice, program code also continually monitors the tokens that comprise these sets in order to refresh any tokens nearing expiration, so that a user who accesses the super token is able to access the desired microservice without needing to renew any of the tokens in the set of tokens required for accessing the full functionality of the microservice. In some embodiments of the present invention, the continuous checking and refreshing of tokens in a set mapped to a super token can occur concurrently with users requesting access to a microservice. Both these aspects can be implemented as services on one or more resources of a shared computing environment, which accounts for the parallel execution of various aspects. To represent the possibility of parallel functionality, FIG. 1 illustrates aspects of the generation of a super token by program code in some embodiments of the present invention while FIG. 2 illustrates the utilization of a super token and the concurrent maintenance of the super token.

Referring to FIG. 1, in some embodiments of the present invention, program code executing on one or more processors of a shared computing environment monitors generation of tokens by an authorization process of the shared computing environment, wherein generated tokens provide applications with access to one or more of a plurality of microservices, accessible through a common gateway, in the shared computing environment (110). In embodiments of the present invention, program code comprising the gateway or accessible to the gateway generates tokens for use by applications to access one or more microservices.

Returning to FIG. 1, the authorization process obtains a request from an application for a first token to be utilized to access a first portion of a microservice of the plurality of microservices (120). In some embodiments of the present invention, a microservice is utilized for a given project and a group of users continuously utilizes this microservice to work on this project (e.g., a development project, a texting project, a deployment, etc.). The authorization process generates the first token responsive to the request (130). Based on monitoring the authorization process, the program code determines that the first token has been generated (140). The program code obtains the first token and stores the first token in a centralized token repository (150).

In some embodiments of the present invention, the program code, based on monitoring the authorization process, determines that a second token has been generated (160). The program code determines that the second token can be utilized to access a second portion of the microservice and that the first token and the second token are a minimum viable set of tokens required for the microservice to function for all designed purposes (165). The program code obtains the second token and stores the second token in the centralized repository (170). As discussed below, in some embodiments of the present invention, rather than store individual access tokens comprising a set in the repository, the program stores only the super token and the additional data in the repository.

The program code generates a super token which includes: 1) generating the super token; 2) mapping the super token to the first token and the second token; and 3) enriching the super token based on the first token and the second token to capture details relevant to the first token and the second token to enable the super token to remain mapped to a set of valid tokens that enables access to the microservice (175). The program code retains the super token in the centralized repository (180). In some embodiments of the present invention, the program code stores the super token and data mapping the super token to the set of token that are used to access the microservice, in this example, the first token and the second token, in the centralized repository. Thus, the first and second token (the token set) need not be stored centrally, but the ability to access them (i.e., the super token) is stored centrally.

As discussed above, in embodiments of the present invention, the program code can map a super token to a set of tokens by mapping the token to a predefined external application programming interface (API) to access the effective tokens and/or to a specific set of effective tokens and refreshed tokens that were created by a user. In FIG. 1, the first token and the second token are created by users, as they resulted in access requests by a user.

Returning, to FIG. 2, in some embodiments of the present invention, enriching the super token includes enhancing the token to include data related to the set of tokens to which it is mapped (e.g., the first token and the second token), including but not limited to, additional data, metadata, or pointers to facilitate the links between the super token and the tokens. The data can include time of capture, user(s), expiration date, and other related data, including data identifying the validity of the token and/or its term of validity. In some embodiments of the present invention, enriching the super token includes linking the super token to a predefined external API to access the set of tokens utilized to access the microservice. The data mapping the super token to the tokens can be stored in a centralized repository with the super token.

Referring now to FIG. 2, as illustrated in this workflow 200, in some embodiments of the present invention, program code intercepts a user request to access the authorization process to access the microservice (210). The program code directs the user to the super token, which the user utilizes to access the microservice, based on the mapping of the super token to the first token and the second token (220). In some embodiments of the present invention, an authorization is configured such that it provide a user with a super token, if one is available, rather than directing the user to an API to generate a token for accessing a given microservice.

As aforementioned, in embodiments of the present invention, the program code monitors the tokens in a given set utilized to access a microservice. As explained above, in some embodiments of the present invention, the program code includes a token discovery service that follows, analyzes, amends and stores access tokens. Because the service can operate in a continuous manner, FIG. 2 depicts a possible parallel operation of certain aspects. Thus, as illustrated in FIG. 2, in some embodiments of the preset invention, the program code monitors the enhanced data of the super token to determine when each token mapped to the super token is set to expire (215). In some embodiments of the present invention, the program code continually validates super tokens in the repository, including the super token, to assess their validity, including utilizing the super token to access the first one or more microservices. Thus, as illustrated in FIG. 2, before the expiration of each token, the program code requests a reauthorization of the token from the authorization process (225). The program code obtains a refreshed token responsive to each request and maps the super token to the refreshed token (235). The program code enhances the super token to reflect the data of the refreshed token (245), which the program code can provide responsive to the user request (210).

Figure 3:
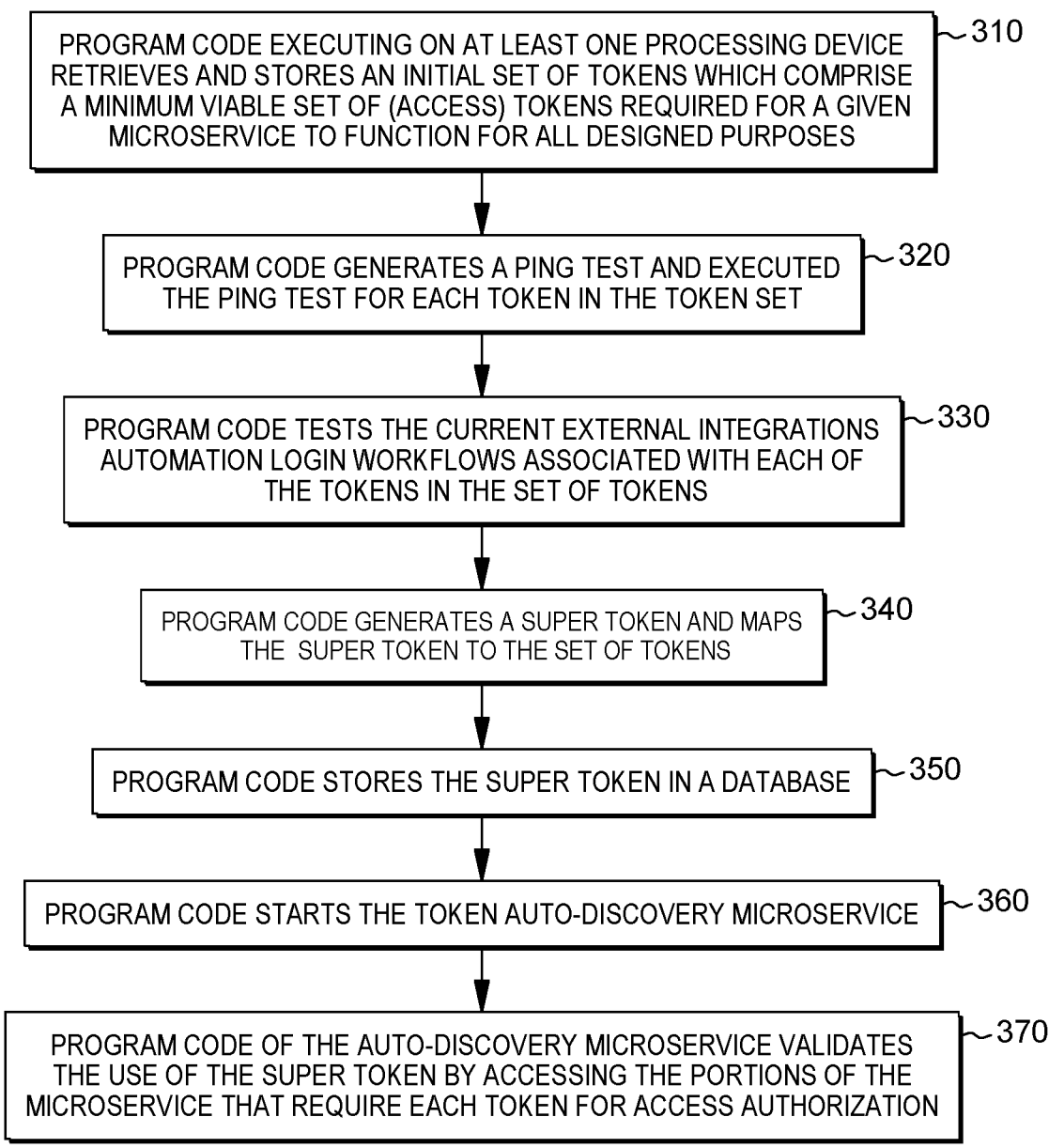
FIG. 3 is a workflow that illustrates certain aspects of some embodiments of the present invention.

FIG. 3 is a workflow 300 that illustrates the creation, utilization and maintenance of several aspects of some embodiments of the present invention. As discussed above, aspects of some embodiments of the present invention comprise enhancements to existing authorization gateways through which applications can access microservices in a shared computing environment, including but not limited to, a cloud computing environment. In some embodiments of the present invention, program code executing on at least one processing device retrieves and stores an initial set of tokens which comprise a minimum viable set of (access) tokens required for a given microservice to function for all designed purposes (310). This set of tokens can be represented as tokenSet {token1, token2, token3, . . . }. The program code generates a ping test and executed the ping test for each token in the token set (tokenSet) (320). In some embodiments of the present invention, the ping test is generated by the program code as part of configuring the microservice that the token set it utilized to access (e.g., the program code executes a config microservice command to generate and ping test each token).

Some embodiments of the present invention include a token auto-discovery microservice. To configure and start this service, the program code tests the current external integrations automation login workflows associated with each of the tokens in the set of tokens (330). In some embodiments of the present invention, the enable this testing, the program code, which comprises the aforementioned token auto-discovery microservice, is implemented in a shared computing environment (e.g., a cloud computing environment) as an enhancement to an existing boot strap external integration. The program code generates a super token and maps the super token to the set of tokens (340). The program code stores the super token in a database (350). In some embodiments of the present invention, the program code generates and stores a super token by running a super token generation endpoint of the auto-discovery microservice.

The program code starts the token auto-discovery microservice (360). In some embodiments of the present invention, once started, this microservice runs continuously on one or more resource in a cloud computing environment. The service can be monitored and restarted in the usual fashion (in accordance with the procedures of the environments for maintaining services) if it goes down.

Once running, the program code of the auto-discovery microservice validates the use of the super token by accessing the portions of the microservice that require each token for access authorization (370). In some embodiments of the present invention, the program code validates the super token (i.e., the token set to which it is mapped) by accessing REST APIs that require token authentication and authorization. Based on the validation results for each token, the program code of the auto-discovery microservice validates the expiry, refreshes, and/or invalidates the tokens in the token set (380).

Figure 4:
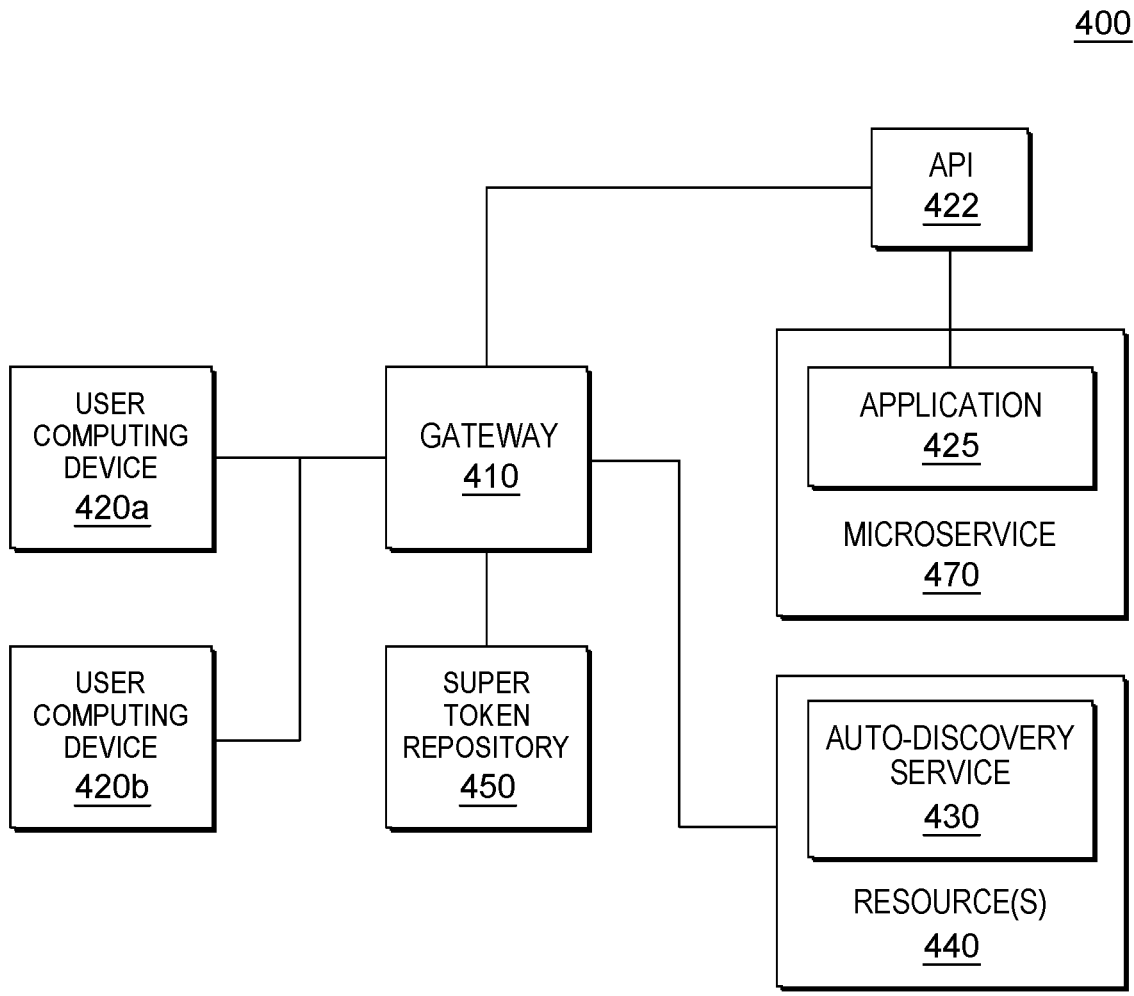
FIG. 4 depicts a technical environment into which various aspects of some embodiments of the present invention can be implemented.

FIG. 4 is a shared computing environment 400 into which aspects of some embodiments of the present invention can be implemented. An example of a shared computing environment into which these aspects can be implemented in a cloud computing environment. The shared computing environment comprises a gateway 410, which can include an API gateway. Through the gateway 410, one or more (authorized) users, via personal computing devices 420a-b, with a valid token, can access an API 422 to access an application 425 that is part of a microservice 470. If the users do not possess valid (access) tokens, the gateway 410 can redirect requests for access to the application with an authorization token, which the application 425 exchanges for access (e.g., an access token). The users can be understood to be part of the same team or group, which is authorized to access the application and the microservice, provided that a valid access token is utilized by these users.

In the shared computing environment, an auto-discovery service 430 is executing one or more resources 440 of the shared computing environment. The auto-discovery service 430 monitors the gateway 410 and the generation of (access) tokens. The program code captures any tokens generated. The auto-discovery service 430 establishes (curates) sets of tokens for each microservice based on monitoring the gateway 410 and generated of access tokens by applications comprising microservices, including the application 425. The auto-discovery service generates a super token mapped to each set. The auto-discovery service 430 saves the super tokens in a super token repository 450, accessible to the gateway 410. The auto-discovery service 430 enhances the super tokens additional data, metadata, and/or pointers. The auto-discovery service 430 stores the additional data (etc.) in the super token repository 450, which can include, but is not limited to, time of capture, user, expiration date, etc. Based on the enhanced data, the auto-discovery service 430 continuously tests the tokens in the set in order to maintain a set of valid tokens mapped to each super token. The auto-discovery service 430 refreshes tokens and updates the additional data (mappings) such that the super token is mapped to a set of valid token. When a user attempts an access to an application 425 that is part of a microservice 470, the gateway 410 can provide an authorized user with access to a super token from the repository, which maps to the set of tokens needed to utilize the microservice 470. If there is no super token yet generated for a given microservice, the auto-discovery service 430 can continue to monitor the generation of access tokens and when a set of access tokens have been generated that provide access to a microservice, the program code then generates a super token and stores the super token in the repository 450.

Embodiments of the present invention include a computer-implemented method, a computer program product, and a computer system, where program code executing on one or more processors of a shared computing environment, monitors issuance of access tokens by one or more applications. The program code determines that a portion of the issued access tokens comprise a set of access tokens that provide access to an application provided as a service in the shared computing environment. The program code generates a super token, where the generating comprises mapping the super token to the set of access tokens. The program code stores the super token in a repository. The program code provides the super token to authorized users requesting access to the application.

In some embodiments of the present invention, the application provided as a service in the shared computing environment comprises a microservice.

In some embodiments of the present invention, the set of access tokens comprises a minimum viable set of access tokens required for the microservice to function for all designed purposes.

In some embodiments of the present invention, the program code evaluates each access token of the set of access tokens to determine validity of each token. Based on determining that one or more access tokens of the set of access tokens are invalid, the program code refreshes the one or more access tokens. The program code updates the mapping to include the refreshed one or more access tokens and to exclude the invalid one or more access tokens.

In some embodiments of the present invention, the program code generating further comprises the program code enriching the super token with elements to map the super token to the set of access tokens, the elements selected from the group comprising data, metadata, and pointers.

In some embodiments of the present invention, the program code stores the elements in the repository. The program code utilizes the elements to facilitate linkages between the super token and the set of access tokens.

In some embodiments of the present invention, the elements are selected from the group consisting of: time of capture, user, expiration date, data identifying validity, and term of validity.

In some embodiments of the present invention, the program code mapping comprises the program code mapping the super token to a predefined external application programming interface to access the set of access tokens.

In some embodiments of the present invention, the program code mapping comprises the program code mapping the super token to the set of access tokens, wherein the set of access tokens was created by a user.

In some embodiments of the present invention, the program code evaluating comprises the program code continuously evaluating based on running an auto-discovery microservice in the shared computing environment.

In some embodiments of the present invention, the program code monitoring the issuance of access tokens is based on the program code running the auto-discovery microservice in the shared computing environment.

Referring now to FIG. 5, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the one or more resources 440 (FIG. 4) executing the auto-discovery service 430 (FIG. 4), and the gateway 410 (FIG. 4), can comprise a cloud computing node 10 (FIG. 5) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aF1pplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
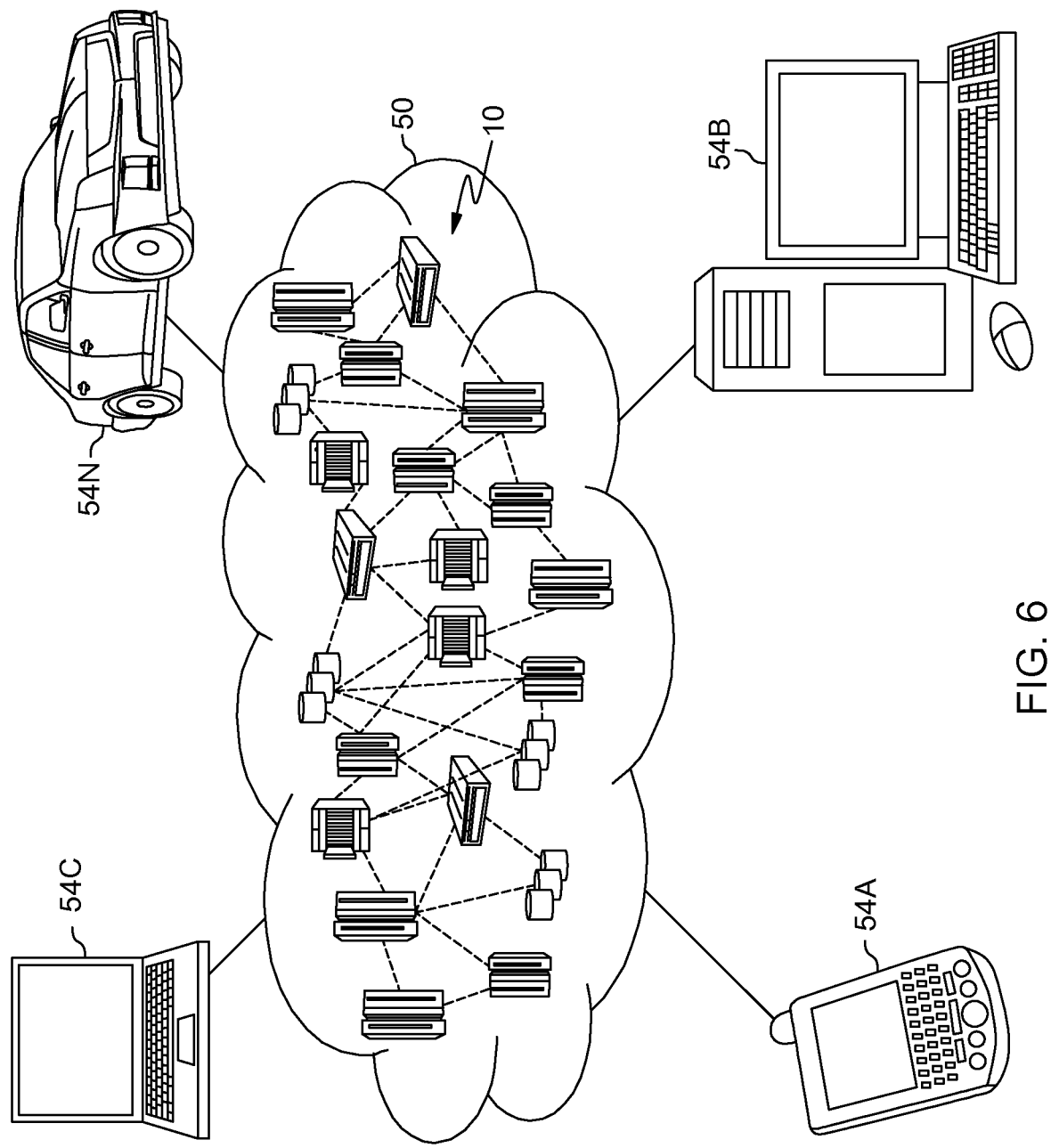
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
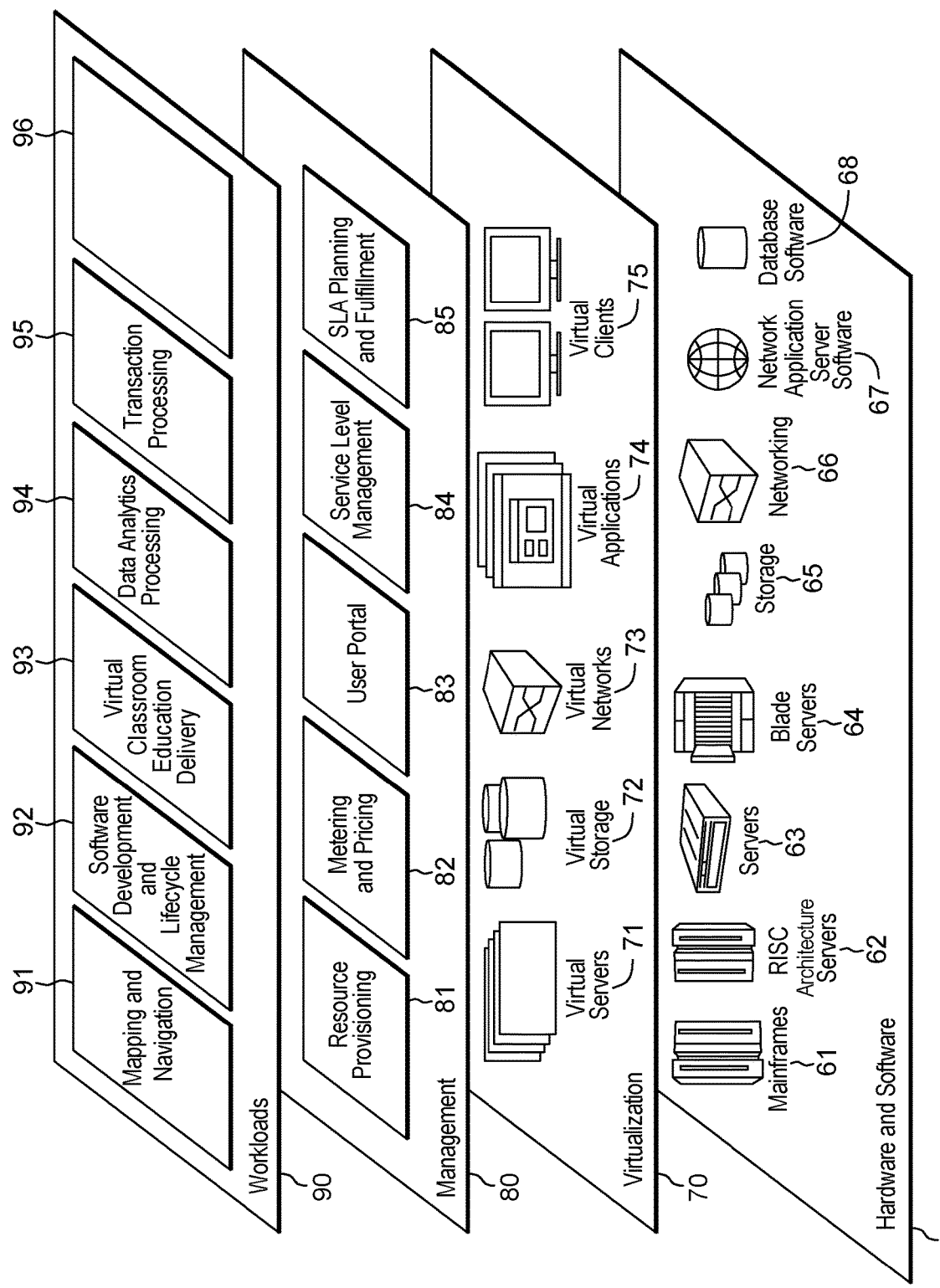
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enabling microservice access through token enhancement and aggregation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
monitoring, by one or more processors of a shared computing environment, issuance of access tokens by one or more applications;
determining, by the one or more processors, that a portion of the issued access tokens comprise a set of access tokens that provide access to an application provided as a service in the shared computing environment, wherein the application comprises a microservice, and wherein the microservice is a collection of loosely coupled services, and wherein access to each service of the collection of loosely coupled services is authorized based on one or more tokens of the set of access tokens;

generating, by the one or more processors, a super token, wherein the generating comprises mapping the super token to the set of access tokens, wherein the set of access tokens comprises a minimum viable set of access tokens required for the collection of loosely coupled services to function for all designed purposes;

storing, by the one or more processors, the super token in a repository;

providing, by the one or more processors, the super token to authorized users requesting access to the application, wherein based on the authorized users providing the super token to a gateway, the authorized users are provided with access to the application, via the gateway; and regularly updating, by the one or more processors, the mapping to include valid tokens for each service of the collection of loosely coupled services.

2. The computer-implemented method of claim 1, wherein regularly updating the mapping further comprises:

evaluating, by the one or more processors, each access token of the set of access tokens to determine validity of each token; and based on determining that one or more access tokens of the set of access tokens are invalid, refreshing, by the one or more processors, the one or more access tokens; and updating, by the one or more processors, the mapping to include the refreshed one or more access tokens and to exclude the invalid one or more access tokens.

3. The computer-implemented method of claim 2, wherein the evaluating comprises continuously evaluating based on running an auto-discovery microservice in the shared computing environment.

4. The computer-implemented method of claim 3, wherein the monitoring the issuance of access tokens is based on running the auto-discovery microservice in the shared computing environment.

5. The computer-implemented method of claim 1, wherein the generating further comprises enriching the super token with elements to map the super token to the set of access tokens, the elements selected from the group comprising data, metadata, and pointers.

6. The computer-implemented method of claim 5, further comprising:

storing, by the one or more processors, the elements in the repository; and utilizing, by the one or more processors, the elements to facilitate linkages between the super token and the set of access tokens.

7. The computer-implemented method of claim 6, wherein the elements are selected from the group consisting of: time of capture, user, expiration date, data identifying validity, and term of validity.

8. The computer-implemented method of claim 1, wherein the gateway comprises a predefined external application programming interface to access the set of access tokens, and wherein the mapping comprises a mapping of the super token to the gateway.

9. The computer-implemented method of claim 1, wherein the set of access tokens was created by a user.

10. A computer program product comprising:

a computer readable storage medium readable by one or more processors of a shared computing environment and storing instructions for execution by the one or more processors for performing a method comprising:

monitoring, by the one or more processors of a shared computing environment, issuance of access tokens by one or more applications;

determining, by the one or more processors, that a portion of the issued access tokens comprise a set of access tokens that provide access to an application provided as a service in the shared computing environment, wherein the application comprises a microservice, and wherein the microservice is a collection of loosely coupled services, and wherein access to each service of the collection of loosely coupled services is authorized based on one or more tokens of the set of access tokens;

generating, by the one or more processors, a super token, wherein the generating comprises mapping the super token to the set of access tokens, wherein the set of access tokens comprises a minimum viable set of access tokens required for the collection of loosely coupled services to function for all designed purposes;

storing, by the one or more processors, the super token in a repository;

providing, by the one or more processors, the super token to authorized users requesting access to the application, wherein based on the authorized users providing the super token to a gateway, the authorized users are provided with access to the application, via the gateway; and regularly updating, by the one or more processors, the mapping to include valid tokens for each service of the collection of loosely coupled services.

11. The computer program product of claim 10, wherein regularly updating the mapping further comprises;

evaluating, by the one or more processors, each access token of the set of access tokens to determine validity of each token;

based on determining that one or more access tokens of the set of access tokens are invalid, refreshing, by the one or more processors, the one or more access tokens; and updating, by the one or more processors, the mapping to include the refreshed one or more access tokens and to exclude the invalid one or more access tokens.

12. The computer program product of claim 10, wherein the generating further comprises enriching the super token with elements to map the super token to the set of access tokens, the elements selected from the group comprising data, metadata, and pointers.

13. The computer program product of claim 12, the method further comprising:

storing, by the one or more processors, the elements in the repository; and utilizing, by the one or more processors, the elements to facilitate linkages between the super token and the set of access tokens.

14. The computer program product of claim 13, wherein the elements are selected from the group consisting of: time of capture, user, expiration date, data identifying validity, and term of validity.

15. The computer program product of claim 10, wherein the gateway comprises a predefined external application programming interface to access the set of access tokens, and wherein the mapping comprises a mapping of the super token to the gateway.

16. A computer system comprising:

a memory;

one or more processors in communication with the memory;

program instructions executable by the one or more processors in a shared computing environment via the memory to perform a method, the method comprising:

monitoring, by the one or more processors of a shared computing environment, issuance of access tokens by one or more applications;

determining, by the one or more processors, that a portion of the issued access tokens comprise a set of access tokens that provide access to an application provided as a service in the shared computing environment, wherein the application comprises a microservice, and wherein the microservice is a collection of loosely coupled services, and wherein access to each service of the collection of loosely coupled services is authorized based on one or more tokens of the set of access tokens;

generating, by the one or more processors, a super token, wherein the generating comprises mapping the super token to the set of access tokens, wherein the set of access tokens comprises a minimum viable set of access tokens required for the collection of loosely coupled services to function for all designed purposes;

storing, by the one or more processors, the super token in a repository;

providing, by the one or more processors, the super token to authorized users requesting access to the application, wherein based on the authorized users providing the super token to a gateway, the authorized users are provided with access to the application, via the gateway; and regularly updating, by the one or more processors, the mapping to include valid tokens for each service of the collection of loosely coupled services.

* * * * *